Oct. 6, 1964 W. D. MACGEORGE 3,151,399
DIFFERENTIAL TRANSFORMER EXTENSOMETER
Filed July 18, 1960

INVENTOR.
William D. Macgeorge
BY
ATTORNEY

United States Patent Office 3,151,399
Patented Oct. 6, 1964

3,151,399
DIFFERENTIAL TRANSFORMER EXTENSOMETER
William D. Macgeorge, Berwyn, Pa., assignor to The Budd Company, Philadelphia, Pa., a corporation of Pennsylvania
Filed July 18, 1960, Ser. No. 43,401
4 Claims. (Cl. 33—147)

This invention pertains to extensometers of the differential transformer type and, more particularly, to such extensometers adapted for coaxial orientation with respect to generally cylindrical workpieces.

Extensometers in general yield an amplified indication, or a convenient signal, proportional to the change in length of a gauge length of a workpiece. Extensometers of the differential transformer type comprise one or more secondary and primary coils linked respectively with opposite ends of a gauge length of the workpiece so as to be moved relatively and proportionately with changes in the gauge length. The coupling between secondary and primary coils varies according to their geometric positions and, therefore, a useful electrical signal is derivable proportional to displacements of the coils and hence proportional to changes in length of the workpiece. However, the extensometer output is precisely relatable to workpiece deformation only to the degree of precision of gauge length definition. Conventional differential transformer extensometers have comprised a coil arrangement laterally displaced to one side of the workpiece position and have required mechanical linkages for lateral transmission of the workpiece displacement. This lateral transmission is an additional source of error, as is the asymmetry of the arrangement. The lateral asymmetry heretofore was deemed necessary for accommodation of both increasing and decreasing gauge length changes and for isolation of the transformer from prejudicial workpiece effects such as workpiece permeability variations and the like.

Therefore, it is an object of this invention to provide a differential transformer extensometer having an axis of symmetry substantially coaxial with associated workpiece gauge length.

A further object is to provide a linear differential transformer extensometer which is symmetrical with respect to the gauge length of the workpiece, substantially independent of any workpiece effects, and adapted for indication of both extension and contraction of the workpiece gauge length from an accurate and reproducible initial gauge length setting.

The foregoing and additional objects and advantages are obtained according to this invention wherein an extensometer for generating signals linearly related with extension and contraction of a gauge length of a workpiece comprises primary and secondary coil means coaxial with the workpiece gauge length, means fixing the secondary coil means with respect to one end of the workpiece gauge length and means fixing the primary coil means with respect to the other end of the gauge length. A further unique feature of an illustrated embodiment of this invention is the incorporation in the extensometer of gauge length defining means including means relatively rotatable from a first position defining the gauge length to a second position accommodating coil means displacement in either direction along the gauge length.

While the invention is best defined in the claims appended to this specification, a better understanding will be had upon consideration of the following description taken in conjunction with the drawing wherein:

Figure 1:
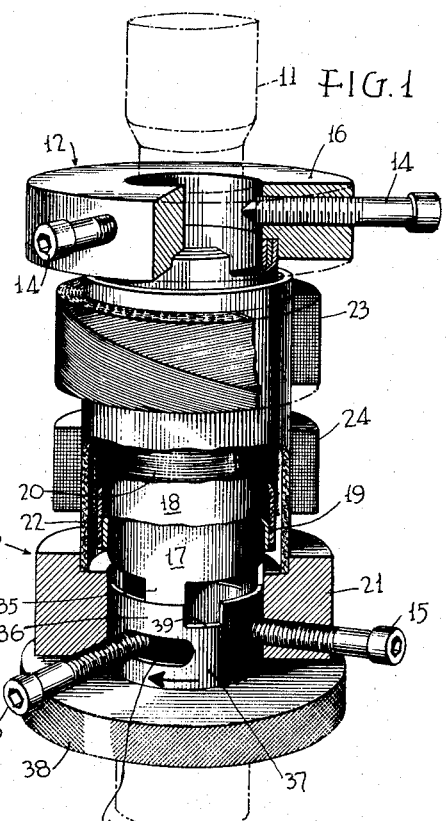
FIG. 1 is a perspective view of a differential transformer extensometer according to this invention.
Figure 2:
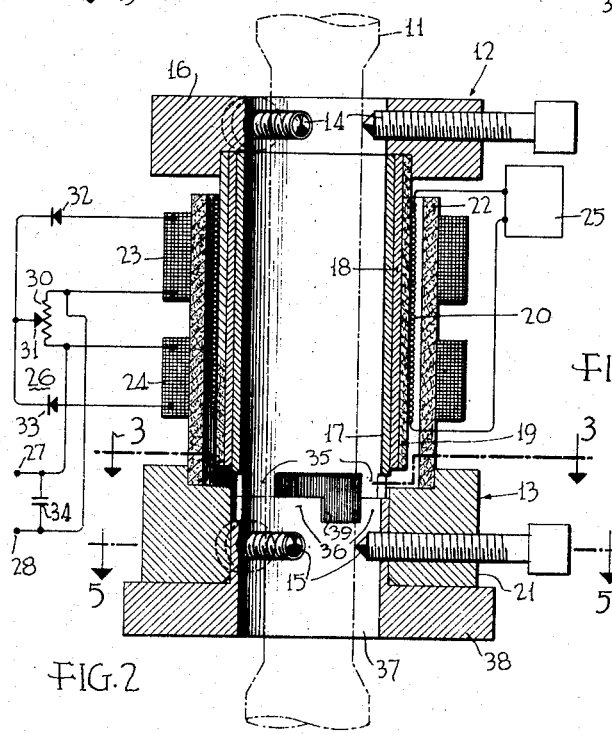
FIG. 2 is a cross section elevation of the extensometer of FIG. 1 taken parallel with the axis of symmetry (more clearly indicated by section line 2—2 in FIG. 3) and illustrating associated circuitry.

With particular reference to FIGURES 1 and 2 the extensometer of this invention is shown in operative relationship with a workpiece 11, generally cylindrical about an axis of symmetry. The extensometer comprises, coaxially aligned with respect to each other and to the workpiece 11, a primary coil means 12 and a secondary coil means 13. As shown, coil means 12 and 13 are adapted for relative telescoping movement; that is, one of the coil means is telescopically insertable within the other coil means. The primary coil means 12 is affixed to the workpiece by set screws 14, at least three set screws 14 defining a circle in a lateral plane intersecting the workpiece 11. The secondary coil means 13 is affixed to the workpiece 11 similarly by means of set screws 15 which define a second lateral plane intersecting the workpiece. The length of the workpiece between the planes defined by set screws 14 and 15 is the gauge length defined for the measurement of unit changes in length of the workpiece.

The primary coil means 12 comprises set screw block 16, structural cylinder 17, magnetic field shielding cylinder 18, cylindrical coil form 19 and differential transformer primary coil 20 wound upon coil form 19. The secondary coil means 13 is illustrated as comprising set screw block 21, cylindrical coil form 22, and duplicate secondary coils 23 and 24 wound upon coil form 22. Obviously, either coil form may be of a material having structural properties and other substitutions will be apparent to those skilled in the art. It is preferable, however, from a manufacturing standpoint that the coil form elements be separable and, only after winding of the coils, rigidly attached to the respective set screw block by pressure fit or other attachment means.

As indicator circuit is diagrammed in FIGURE 2 as an example and includes an oscillatory power source 25 connected to primary coil 20, and an output circuit 26 coupling secondary coils 23 and 24 with output terminals 27 and 28. A first portion of output potentiometer 30 is connected in parallel with secondary 23 and the remaining portion is connected in parallel with secondary 24; the secondary coils 23 and 24 are wound with respect to the winding of primary 20 so that induced secondary voltages appear in opposition upon output potentiometer 30. Before the testpiece 11 is loaded, potentiometer tap 31 is adjusted so that the opposed voltages impressed upon potentiometer 30 are equal, whereupon output terminals 27 and 28 are at the same potential. Thereafter, deformation of the workpiece 11 results in relative telescopic displacement of the primary coil means 12 and secondary coil means 13 and a difference in the amplitude of the secondary voltages. The amplitude difference in turn appears as a potential difference between output terminals 27 and 28 for sensing by conventional indicator or recording instruments. Rectifiers 32 and 33 and capacitor 34 may be employed to produce a D.C. output.

Ordinarily a structural arrangement wherein the magnetic fields of the coils encompass the workpiece, would be expected to exhibit serious difficulties due to workpiece effects. However, according to this invention, a highly permeable material shield 18 shunts the magnetic fields so that only insignificant flux traverses the workpiece. Therefore, variations in workpiece permeability at most are second order effects and do not interfere with accuracy and precision of the differential transformer output.

In order to provide for precise setting of the gauge length the primary coil means is provided with a set of extensions 35 fixed relative to set screws 14; and secondary coil means 13 is provided with a set of complementary extensions 36 fixed insofar as axial translation with respect to secondary coil means 13 is concerned, but rotatable about the axis of symmetry independently of the coil means 13. The independently rotatable portion of the secondary coil means 13 includes slotted cylinder 37 and knurled disk 38 for convenient manipulation.

Figure 4:
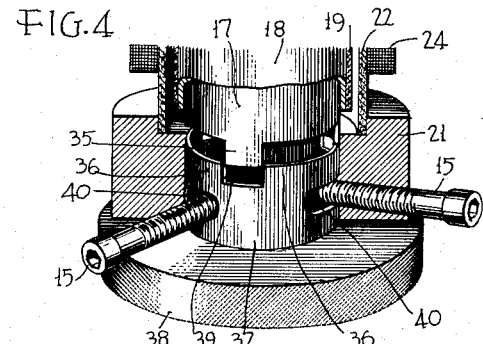
FIG. 4 is a partial perspective view showing gauge length setting means rotated to measurement position.

As seen in FIGURE 1, during gauge length setting, the gauge length definition means 37 is rotated relative to the extensometer coil means to a position where extensions 35 and 36 are opposite. With extensions 35 and 36 maintained in contact, set screws 14 and 15 are tightened against the workpiece, thus automatically defining therebetween a known precise, and reproducible gauge length for the extensometer. After the set screws have been tightened against the workpiece, the gauge length defining means 37 is rotated in the direction of the arrow of FIGURE 1 to the position, shown more clearly in FIGURE 4, in which extensions 35 and 36 are opposite spaces defined therebetween. Therefore this gauge length definition means is adapted to allow bidirectional deformation along the gauge length without interference.

Figure 3:
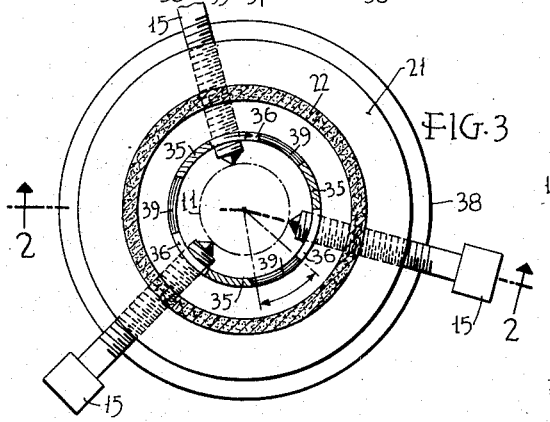
FIG. 3 is a cross section taken laterally of the axis of symmetry (more clearly indicated by section line 3—3 in FIG. 2) illustrating angular orientation of the gauge length setting means.

FIGURE 3, a cross section taken along the parting plane delineated in FIGURE 2, illustrates the angular orientation of extensions 35 and spaces 39 between extensions 36 at the gauge length setting position. Rotation of knurled disk 38, counter-clockwise in this view, will align extensions 35 with spaces 39 allowing relative telescopic approach of the coil means during compression loading of the specimen 11. This latter is the measuring position seen more clearly in the partial perspective of FIGURE 4.

Figure 5:
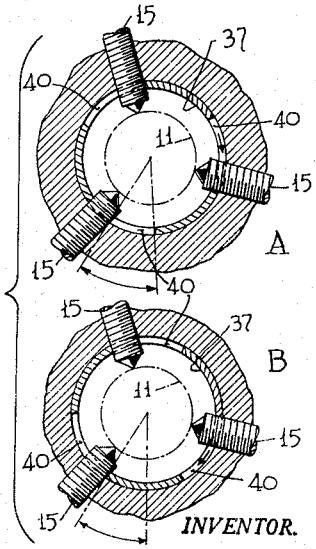
FIG. 5 illustrates (by sections located by section line 5—5 in FIG. 2) rotation of the gauge length setting means between setting and measurement positions.

FIGURE 5 illustrates cooperation between slots 40 formed in gauge positioning means 37 and set screws 15 to delimit the extreme positions of rotation of cylinder 37. At A, the extreme clockwise position of the cylinder 37 is defined corresponding to the gauge length setting position of FIG. 1; at B the extreme counterclockwise position defines the measuring position of FIG. 4.

This invention provides an extremely rugged and efficient extensometer with a minimum of parts. Obviation of the usual armature of prior differential transformer extensometers is an example of the advantages obtained. Further, it should be realized that the illustrated embodiment may be altered to accommodate various test specimen configurations. No restriction is intended to circular symmetry and other generally cylindrical shapes, as with rectangular cross sections, may be employed without departing from the fundamental principle of coaxial encompassing of the testpiece by the telescopic coil means.

Various material substitutions may be made such as employing so-called mu-metals, CoNi alloys, for the shield 18. The shield may be plated with a highly conducting metal such as silver and perform the dual function of electrostatic and magnetic shielding. Further, in some cases, as with low-frequency excitation, the shield may be eliminated without deleterious effects.

What is claimed is:

1. A differential transformer extensometer for measuring changes in length along an axis of a gauge length of a generally cylindrical workpiece, said extensometer comprising relatively movable telescoping primary and secondary differential transformer coils of generally cylindrical shape encompassing the workpiece and means fixing the position of one of said coils with respect to one end of said gauge length and the other of said coils with respect to the other end of said gauge length.

2. A differential transformer extensometer for measuring changes in length along an axis of a gauge length of a generally cylindrical workpiece, said extensometer comprising primary coil means including a differential transformer primary coil and first attachment means fixing axial position of the primary coil relative to one end of the gauge length, and secondary coil means including a differential transformer secondary coil and secondary attachment means fixing axial position of said secondary coil relative to the other end of said gauge length, said coil means coaxially encompassing the workpiece, and one of said coils coaxially encompassing the other of said coils, whereby voltage signals induced in said secondary coil in response to excitation voltage signals supplied to said primary coil vary according to relative axial position of the coils and, hence, according to changes in length of the workpiece.

3. A differential transformer extensometer for measuring changes in the length of a gauge length of a generally cylindrical workpiece along an axis, said extensometer comprising a symmetrical primary coil means including a primary support, a primary coil wound about said primary support, and a primary attachment means fixing the axial position of the primary coil means relative to one end of the gauge length, a symmetrical secondary coil means including a secondary support, at least one secondary coil wound about said secondary support, and a secondary attachment means fixing the axial position of the secondary coil means relative to the other end of the gauge length, one of said coil means being telescopically oriented coaxially within the other of said coil means, each said coil means including cylindrical extensions defining complementary recesses therebetween, the extensions of one said coil means being independently rotatable about said axis from a first position wherein extensions on said primary coil means are opposed to extensions on said secondary coil means, to a second position wherein the extensions of one said coil means are angularly disposed between the extensions of the other said coil means.

4. A differential transformer extensometer for measuring changes in length of a gauge length of a generally cylindrical workpiece along an axis, said extensometer comprising telescoping, coaxial, generally cylindrical primary and secondary coil means, said primary coil means including a set screw block and a plurality of radially disposed set screws engaging the workpiece at one end of the gauge length, first cylindrical means depending coaxially from said block including a cylinder of a magnetic shielding material, a primary coil wound about said first cylindrical means, and said first cylindrical means having first cylindrical sector extensions defining recesses therebetween, said secondary coil means including a secondary block, a second cylindrical means extending from said block, at least one secondary coil wound about said second cylindrical means, radially disposed set screws threadedly traversing said block and engaging the other end of said gauge length of said workpiece, rotatable gauge setting means apertured to define slots traversed by said set screws and having second cylindrical extensions coaxially aligned with said first extensions and defining recesses therebetween, said gauge setting means being rotatable independently of said coil means from a first position in which the extensions are axially opposed to a second position in which first extensions are axially opposed to spaces defined between second extensions.

References Cited in the file of this patent
UNITED STATES PATENTS

| | | |
|---|---|---|
| 2,301,872 | Henderson | Nov. 10, 1942 |
| 2,578,066 | Hyde | Dec. 11, 1951 |
| 3,028,754 | Huyser | Apr. 10, 1962 |